United States Patent [19]
Morgan et al.

[11] Patent Number: 5,239,466
[45] Date of Patent: Aug. 24, 1993

[54] SYSTEM FOR SELECTIVELY ROUTING AND MERGING INDEPENDENT ANNOTATIONS TO A DOCUMENT AT REMOTE LOCATIONS

[75] Inventors: David E. Morgan, Lisle; John Major, Barrington Hills; Eric K. Crane, Wheaton; Janusz Hyziak, Des Plaines; Robert S. Rosenthal, Kildeer, all of Ill.; Neil N. Wellenstein, Phoenix, Ariz.

[73] Assignee: Motorola, Inc., Schaumburg, Ill.

[21] Appl. No.: 771,690

[22] Filed: Oct. 4, 1990

[51] Int. Cl.[5] .......................... G06F 3/14; G06F 15/00
[52] U.S. Cl. ..................................... 395/148; 395/200; 395/800; 364/DIG. 1; 364/222.82; 364/222.9; 364/225.8
[58] Field of Search ............................... 364/900, 419; 340/825.29, 825.72; 395/295, 800, 200

[56] References Cited
U.S. PATENT DOCUMENTS

| 4,571,699 | 2/1986 | Herzog et al. | 364/900 |
| 4,574,284 | 3/1986 | Feldman et al. | 340/825.52 |
| 4,754,428 | 6/1988 | Schultz et al. | 364/900 |
| 4,823,122 | 4/1989 | Mann et al. | 340/825.28 |

OTHER PUBLICATIONS

Joyce K. Reynolds et al., "The Darpa Experimental Multimedia Mail System", Computer, Oct. 1985, pp. 82–89.

Primary Examiner—Thomas C. Lee
Assistant Examiner—Burch Harper
Attorney, Agent, or Firm—Steven G. Parmelee

[57] ABSTRACT

A personal communicating computer (112) (FIG. 1) remains in contact, via a wireless network, with an office server (101). Documents from various sources can be transmitted to the personal communicating computer (112) using this network. Upon receipt, such documents can be accessed and utilized in a variety of ways. In particular, such documents can be annotated in a variety of ways, and those annotations forwarded on to other destinations for appropriate review and handling.

15 Claims, 4 Drawing Sheets

SYSTEM FOR SELECTIVELY ROUTING AND MERGING INDEPENDENT ANNOTATIONS TO A DOCUMENT AT REMOTE LOCATIONS

FIELD OF THE INVENTION

This invention relates generally to the field of communications, including but not limited to document reception and alteration.

BACKGROUND OF THE INVENTION

The communication needs of a modern business person are many and varied. During the course of a typical day, many such persons receive, create, review, act upon, respond to, alter, and/or send a wide variety of both tangible and electronic messages. Such messages, for example, include letters, memorandum, and reports appearing both on paper and in electronic form, facsimiles, graphic information in both tangible and electronic forms, spreadsheet information (either in the form of a report or in the context of a spreadsheet application program), and a wide variety of small notes, such as instructions, inquiries, or comments and the like as scribbled by hand on tangible copies of such documents. All of the above, and other examples of like kind, can generally be considered as visual information (as versus, for example, oral information).

In the context of a typical office setting, such visual information comprises an acceptable and relatively efficient manner of facilitating communication between co-workers and others in a substantially time sensitive manner. When a business person travels away from his or her office, however, access to this visual message infrastructure is essentially lost. As a substitute, most time sensitive issues are dealt with orally by use of a telephone. Facsimile transmissions, overnight delivery services, and wireline modem equipped portable computers also provide some measure of visual information exchange when away from the office, but represent only a small portion of the overall visual messaging capabilities that are available in an office environment.

Accordingly, a need exists for a communication solution that will address the above concerns.

SUMMARY OF THE INVENTION

This need and others are at least partially met through provision of a personal communicating computer and a system and method used therewith.

Pursuant to one embodiment of the method, a document can be accessed using the personal communicating computer, and a user can enter first user input, second user input, and so forth, which input comprises annotations to the document. The user can then provide destination information for the annotations, wherein the destinations can be varied as between the different annotations.

In one embodiment of the invention, the personal communicating computer only transmits the annotation information to the indicated destinations, along with an identifier of the document that has been annotated. Upon reception, a stored version of the identified document can then be coupled with the annotation and viewed in its appropriate context. By this provision, transmission resource requirements are minimized.

In one embodiment of the invention, the personal communicating computer operates in a system that includes at least one information system server. This server has the capacity to transmit and receive via both a wireline network and a wireless network.

DESCRIPTION OF A PREFERRED EMBODIMENT

Figure 1:
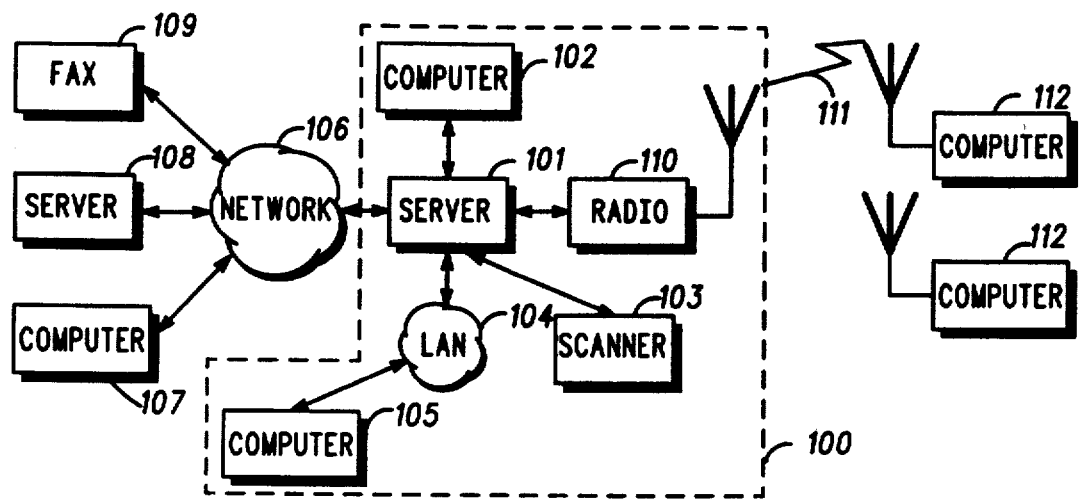
FIG. 1 comprises a block diagram depiction of a communication system configured in accordance with the invention.

FIG. 1 depicts generally a communication system configured in accordance with the invention. Those elements of the system that are included within a user's office are generally denoted by reference numeral 100. In this office (100) a server (101) functions to intercouple various document entry and reception devices. For example, the server (101) couples directly to a computer (102) and a scanner (103) co-located in the office (100). In a manner well understood in the art, the server (101) can both transmit to and/or receive document information from both of these directly coupled terminals.

The server (101) also couples to a local area network (104) within the office (100), and via the local area network (104) couples to other terminals and workstations as well, such as the computer (105) depicted. So configured, the server (101) can transmit to various of the terminals documents originated by other terminals within the office (100).

In general, the above elements, both individually and in the configuration depicted, are well understood in the art, and hence additional description will not be provided here.

The office server (101) also couples to a network (106) located exterior to the office (100). This network may be, for example, a public switched telephone network, an integrated services digital network, or other publicly accessible or privately maintained communication network. Via this network (106), the server couples to other source and/or destination terminals, such as other computers (107) and facsimile machines (109) as well as other servers (108). Again, such a configuration, and the components thereof, are generally well understood in the art.

Pursuant to this embodiment, the office server (101) also couples to a two-way radio (110), which radio functions as a radio frequency modem. (It should be understood that the "radio" (110) may also be provided by coupling to a radio system, such as a multi-frequency, multi-base-site system having central or distributed control of channel allocation within the system.

For example, the server (101) could couple to the network control processor of a Motorola trunked radio system such as a Smartnet system.) So configured, the server can communicate data messages (111) between itself and other computers (112) that are also radio equipped. Depending upon the type of message and the capabilities of the radio (110) (or radio system), these messages can be communicated as point-to-point, point-to-multi-point, point-to-network-to-multi-point, network-to-network, and so forth. Such radio equipped computers are referred to herein as personal communicating computers.

Using the above architecture, the office server (101) can receive and transmit a variety of documents both within and without the office (100) environment using both a wireline network and a wireless network. This, of course, includes the capability of accessing the data storage of other computers that are directly coupled to the server, or that can be reached via the local area network (104).

Figure 2:
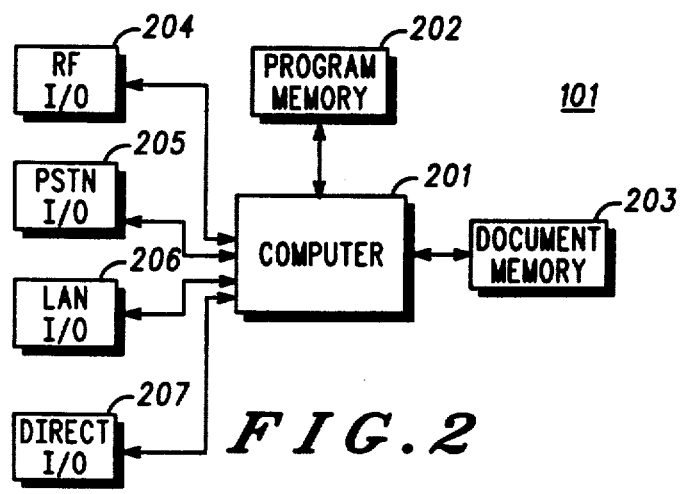
FIG. 2 comprises a block diagram depiction of a server as configured in accordance with the invention.

FIG. 2 depicts the office server (101) in more detail. The office server (101) includes generally a computer (201) that serves as a processing platform consistent with the needs of a particular application. A program memory (202) couples to the computer (201) and provides appropriate storage facilities for the operating instructions for the server (101). The computer (201) also couples to a document memory (203), wherein documents can be stored by the server (101).

In order to facilitate coupling of the server (101) to the various terminals, local area networks, and other networks as described above, the computer (201) also couples to various input/output devices, such as the radio frequency input/output unit (204), the public switched telephone network input/output unit (205), the local area network input/output unit (206) and other direct input/output units (207) as appropriate to directly couple the server (101) to computers (102), scanners (103), and other document source and destination points as desired.

The above elements are generally understood in the art, both alone and in the combination depicted. What is particularly appropriate to understand at this point is that the office server (101) constitutes a programmable platform that can be appropriately programmed to operate in accordance with the teachings of the invention.

Figure 3:
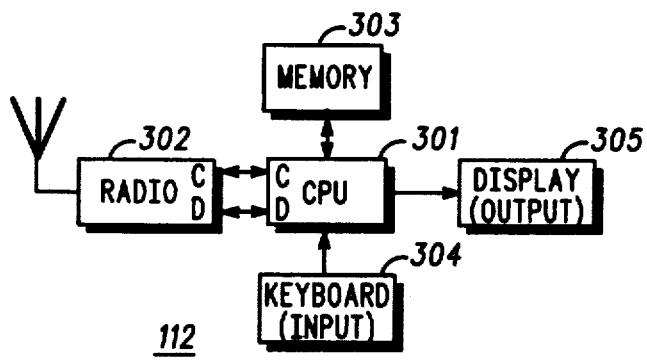
FIG. 3 comprises a block diagram depiction of a personal communicating computer as configured in accordance with the invention.

The personal communicating computer (112) referred to briefly in FIG. 1 appears in more detail in FIG. 3. The personal communicating computer (112) includes a central processing unit (301). The central processing unit (301) has both control and data links to a two-way radio (302), the latter being compatible with the radio services used by the office server (101) (FIG. 1). The central processing unit (301) of the personal communicating computer (112) also couples to a memory (303) (which memory stores appropriate operating instructions as well as user documents), to a keyboard (304) or other appropriate user input device, and to a display (305) or other appropriate user information output device.

The basic components, both alone and in the configuration depicted, of the personal communicating computer are well known and understood in the art. What is again important to understand here is that the personal communicating computer constitutes a programmable platform that can be programmed to operate in accordance with the teachings of the invention.

As noted earlier, the office server (101) is substantially universally coupled to all document source machines, and receives documents intended for transmission from an originating point to one or more indicated destination points. In order to accommodate the needs of this embodiment, when providing such a document to the server, the originating party will also provide an accompanying message identifying the intended destination or destinations of the document. In accordance with one embodiment of the invention, the originating party may also include an expiration date, which expiration date indicates a time beyond which the office server (101) should no longer continue attempts to forward the document to an indicated destination.

Figure 4:
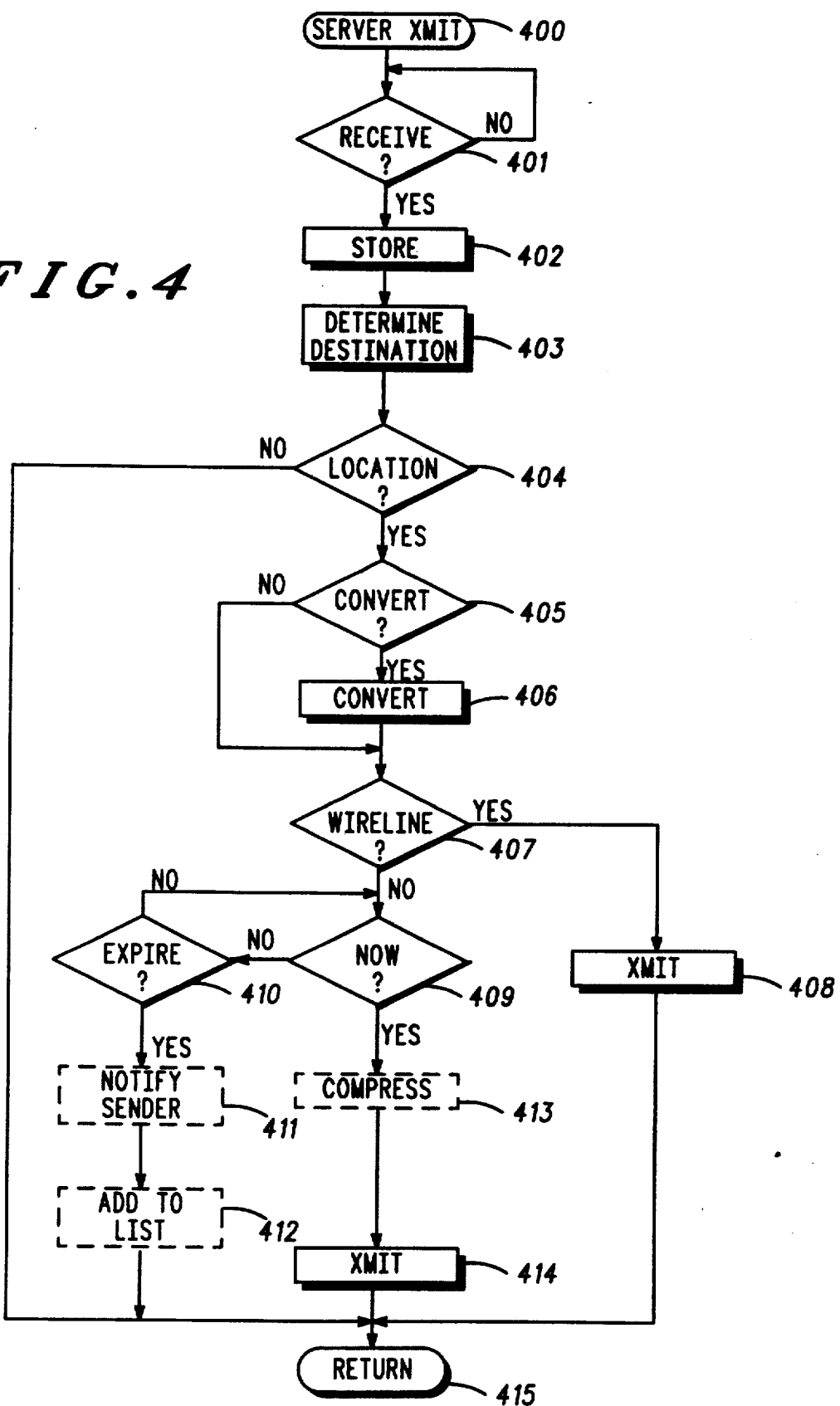
FIG. 4 comprises a flow diagram depicting transmission operation of the server.

With reference to FIG. 4, the document transmission mode (400) of the server will now be set forth. Upon receiving a document (401), the server stores the document (402) in its document memory (203 of FIG. 2) and then determines the intended destination(s) (403) of the document by considering the destination information provided by the originating party. Since at least some "intended destinations" are portable (and likely move about regularly), this process will often likely include a location determining step. Location of the roaming destinations can be determined in a variety of known ways. For example, present location can be determined through use of a system-wide poll. In the alternative (or in addition), the roaming units can either voluntarily or automatically register their present location with the server (or with a database platform of a supporting radio system that is accessible by the server). It is also possible that determining an appropriate destination will require consideration of supplemental destination information and/or user specified destination preferences (for further elaboration with respect to both of these concerns, see CM-01311H, entitled "Message Routing and Destination Selection," and CM-01357H, entitled "Temporary Message Routing and Destination Selection", both of which were filed on even date herewith and are incorporated herein by this reference).

If not determined earlier, the server then determines the present location of the intended recipient device (404) (by accessing a database containing current locations as determined via a registration process, or by polling). If location cannot be determined, the process concludes (415) (if desired, a message to this effect can be sent to the originating party). If location of the destination is known (404), the process determines whether conversion of the document, from one format to another, is required (405). For example, the server may receive the document in a first format, and have access to information indicating that the intended destination prefers a second format. Or, by way of another example, the transmission medium that the server must select in order to transmit the document may not be compatible with the original format of the document. Based upon such issues and knowledge, and presuming that a format conversion routine is available to the server, the format of the document will be changed (406) to meet this preference or need (for further information regarding such format preference indications, the reader is again referred to the previously mentioned patent application entitled "Message Routing and Destination Selection").

If access to the intended destination by the wireline network is available (407), the server transmits the document (408) via that network to the intended destination. (Some small delay may of course be experienced due to contention protocols and other access time issues; nevertheless, for purposes of this explanation, it may be considered that transmission of the document in this way occurs in a relatively real time context.) This transmission activity (408), of course, can involve a variety of other activities as desired and/or as appropriate to a particular application. For example, the server can first determine whether the selected destination can be reached via the local area network (104), or whether the wide area network (106) must be selected. In either case, compression of the document may also be appropriate to minimize bandwidth requirements and/or transmission time. Such compression can be provided in a variety of known manners. Also, the server can monitor whether transmission actually occurs, or is prevented due to a temporary problem (line disruption, bus contention, and the like). When monitoring this parameter, the server can additionally determine whether further attempts to transmit the document should be terminated. In this regard, a default time period or the user specified expiration time period can be used to provide a measure against which such a decision can be made.

Following transmission (408), the server can return to other activities (415).

When wireline access cannot be had for a particular indicated destination (407), the server will determine whether wireless access to the intended destination is currently available (409). If not, the server will monitor from time to time to determine whether such wireless connectivity occurs at a later time. At the same time, the server will occasionally determine whether the expiration time provided by the originating party has occurred (410). If the expiration time occurs before transmission can occur, the server will terminate attempts to transmit the document. In one embodiment of the invention, the server also provides to the originating party an indication of this failure to transmit the document (411). In yet another embodiment, the server will add an identification of the document, along with other relevant information (such as the identity of the originating party and the age of the document), to a list of documents that could not be sent (412). A user could then interrogate the server and receive at least identifying information regarding the dropped messages, and could then potentially take action to contact the originating party and seek a retransmission of the document.

Presuming that the expiration time has not occurred, and that a wireless connection becomes available (409), the document can, when appropriate, be compressed (413) in accordance with well understood technique to minimize its bandwidth requirements, and then transmitted (414) via the server's radio (110 of FIG. 1) to the intended personal communicating computer (112 of FIGS. 1 and 3).

Figure 5:
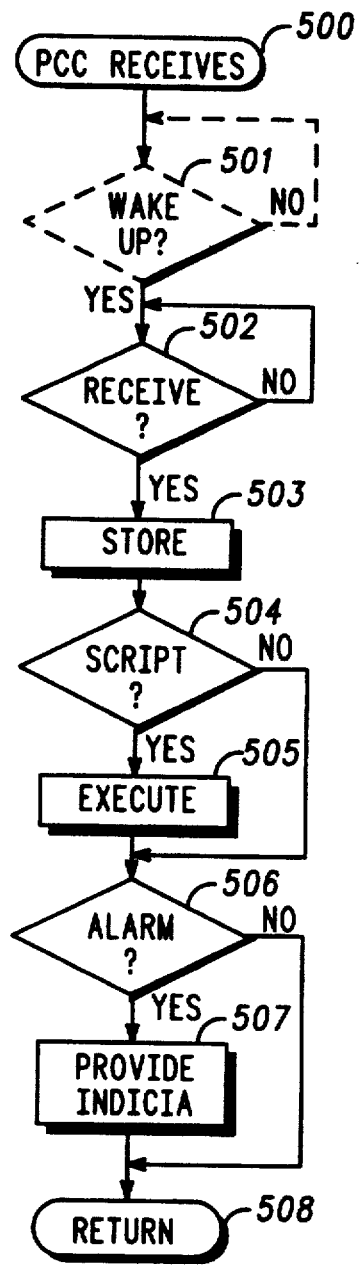
FIG. 5 comprises a flow diagram depicting reception operation of the personal communicating computer.

Referring now to FIG. 5, the reception operation (500) of the personal communicating computer (112) will be described.

Since the personal communicating computer (112) likely constitutes a portable device, it will not likely be maintained in a fully operational operating mode at all times, since this would deplete its portable power source relatively quickly. Rather, in accordance with well understood technique, the personal communicating computer (112) will likely include a sleep capability, whereby the computer operates in a very low current drain mode on an intermittent basis. These low current episodes are interrupted from time to time by a wake-up mechanism of choice (501).

During such a period of higher level activity, the personal communicating computer (112) can become aware that the server (101) has a message intended for its reception. (There are many ways known in the art by which this can be accommodated. For example, the server can transmit via its coupled radio an occasional announcement listing those personal communicating computers for which it currently has a message. Upon receiving such an indication, the personal communicating computer can transmit an indication of its readiness to receive the document. By way of another example, the personal communicating computer (112) can be equipped with two radios, with one of the radios being a pager. Independent wide area paging systems would then be used to page the computer (112) and alert it to the need to access its other radio link to receive a message. As yet one more example, the user could himself carry an independent pager. The server (101) could access this pager via the paging infrastructure, and directly alert the user of the need to access the wireless network with his personal communicating computer.) The personal communicating computer (112) then receives the document (502) as transmitted via the wireless network. The received document is then stored in memory (303 of FIG. 3).

When transmitting the document to the personal communicating computer, the server may include one or more scripts with the document. Such scripts can constitute instructions for the personal communicating computer that are to be executed with respect to the document. For example, if a document has been transmitted in accordance with a particular compression technique, the script can identify that compression technique to thereby allow the receiving device to decompress the information. Other scripts could accommodate format conversion requests, decryption, obtaining other files to include during prsentation of the document, subsequent routing instructions (to accommodate, for example, a series of approval steps), a particular form or template for presentation of the contents of the document, a return receipt procedure, and filing instructions.

In the flow depicted, when such a script is included with the document (504), the script will be executed (505).

An appropriate alarm (506) may then be sounded, along with other indicia as desired or appropriate, to indicate reception of the document (507). In the alternative, such indicias may be avoided, and the reception process may be completed (508) without use thereof. For example, certain categories of documents, or certain documents within a particular category, may be time critical, and for such documents it would be appropriate to provide a signal to the user to attract the attention of the user and indicate that the document has been received.

Figure 6:
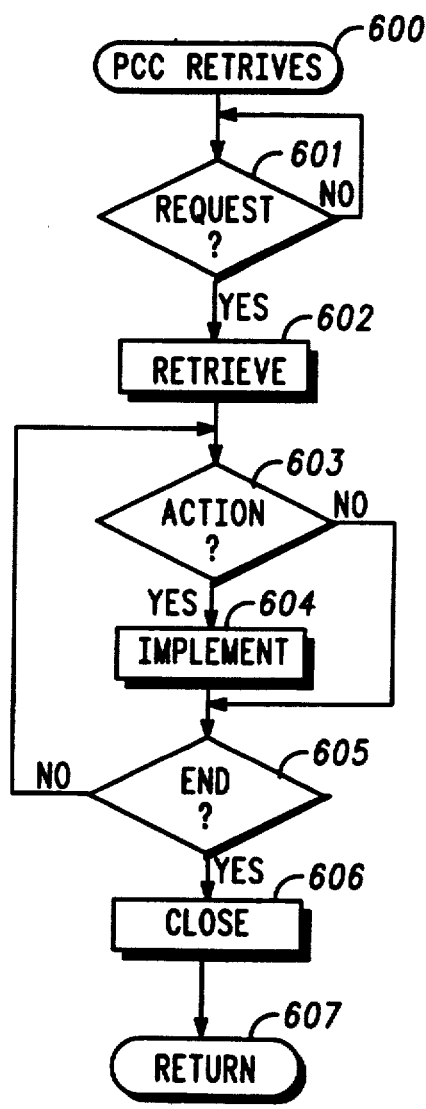
FIG. 6 comprises a flow diagram depicting document retrieval operation of the personal communicating computer.

Referring now to FIG. 6, at some time following reception of a document as described above, a user may choose to access the document (600). Upon receiving such a request (601), the personal communicating computer retrieves the document (602) from memory and then awaits further input indicating those actions (603) that are to be taken with respect to the document. As such actions are taken, the personal communicating computer implements those actions (604) and monitors for a conclusion of these activities (605). When the user concludes the document access procedure, the personal communicating computer closes the document (606) and returns to other tasks at hand (607).

The actions that can be taken with respect to a particular document are, of course, widely varying. A word processing document could be entered using the appropriate word processing package, and edited or otherwise revised accordingly. A spreadsheet document could be similarly opened using the appropriate spreadsheet application, and the information utilized in a manner consistent with that application.

Of particular interest here is an ability to annotate the document with one or more annotations. Such annotations are intended here to be very much akin to the notes placed by a business person on tangible visual messages in his or her office environment, such as notes scribbled on a document. Such tangible notes are typically intended for review and action by others, and to facilitate this, the tangible item itself, along with the personally inscribed annotation, makes its way to such other individuals for appropriate action.

In a very significant way, the present embodiment is directed towards a similar capability; i.e., allowing a user outside of his or her normal office environment to receive a document, to conveniently annotate it, and to thereafter forward that document, with appropriate annotations, to the intended party. With such a capability, a business person not in their office can nevertheless review, process, delegate, and otherwise carry on many of their normal activities notwithstanding their not then currently being in an office.

Figure 7:
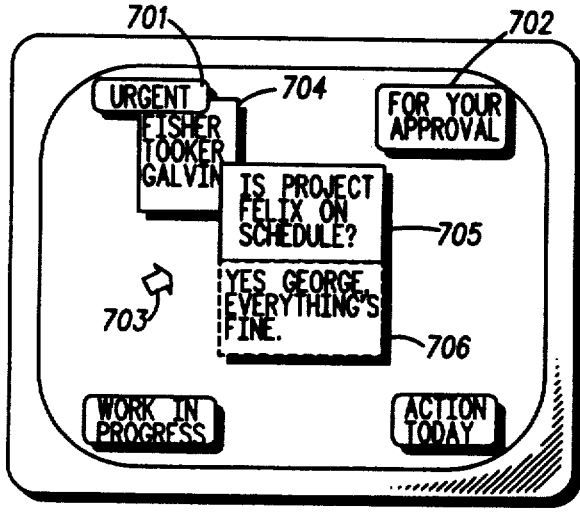
FIGS. 7, 8, and 9 comprise various example views of the display of the personal communicating computer.

Consider, for example, FIG. 7. In this embodiment, the display (305) of the personal communicating computer (112) includes a plurality of pull down menus, including an "urgent" menu (701) and a "for your approval" menu (702). (Documents as received by the personal communicating computer can include a document type indicia, as appropriate to a particular user application, which indicia can indicate one of these categories.) A user using a typical pointer (703) can select the "urgent" menu (701), thereby revealing the full menu (704). In this example, "urgent" memos have been received from three individuals, namely Fisher, Tooker, and Galvin. Assuming, for continued purposes of this example, that the user selects the Fisher entry, the relevant document is accessed and opened as described above. In this particular example, the document consists of a short message, "Is project Felix on schedule" (705). In accordance with this invention, the applicant can open an annotation object through use of an annotation application, and enter user input comprising a first annotation (706) to the document. (In this embodiment, this first annotation comprises the message, "Yes George everything's fine." The user can then close this annotation (thereby allowing subsequent reopening and modification), or seal the object such that it cannot be reopened for editing.

If desired, the user could provide other annotations to the original document (705) as well. For example, the user could repeat the above process to enter a second annotation which might read, for example, "Eric, is everything fine?" It should be noted that such additional annotations comprise annotation objects that are independent of other annotation objects, including that object which contains the first annotation described above. The user could also include, with the annotation, a related document. This related document could be included either by copying all or a part of the related document and pasting the copied portion in the annotation itself, or by including the related document as an attachment to the annotation. Further, this related document could be one that is retrieved locally from within the personal communicating computer (112), or remotely from another source as accessed via the wireless link.

The user then enter transmission commands, which commands include or imply a particular destination. (The destination may be implied if the user simply indicates that the document is to be replied to.) In the present example, the user would reply to the original sender using his first annotation. The user could also provide destination information to allow annotation information to also be forwarded to another party. In this example, the user could elect to send both annotation number one and number two to a second party using this mechanism. For this second party, both annotations represent first and second protions of a message that are effectively combined to represent a single message intended for that party.

It should be noted that, when transmitting the annotation information in accordance with the user's instructions, the annotations are transmitted accompanied by a reference to the original document, but are not transmitted inclusive with the original document. In this way, only the annotation information need be transmitted, thereby reducing bandwidth requirements. Upon receiving the annotation information, the office server (101) combines that annotation information with original document information as previously stored by it, and then provides a correctly annotated version of the document to the appropriate destination. To ensure security, each annotation can only be functionally combined with the original document.

Figure 8:
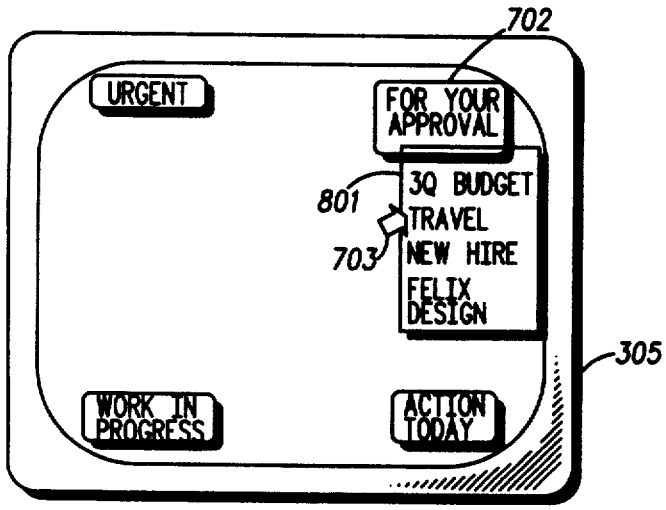
Figure 9:
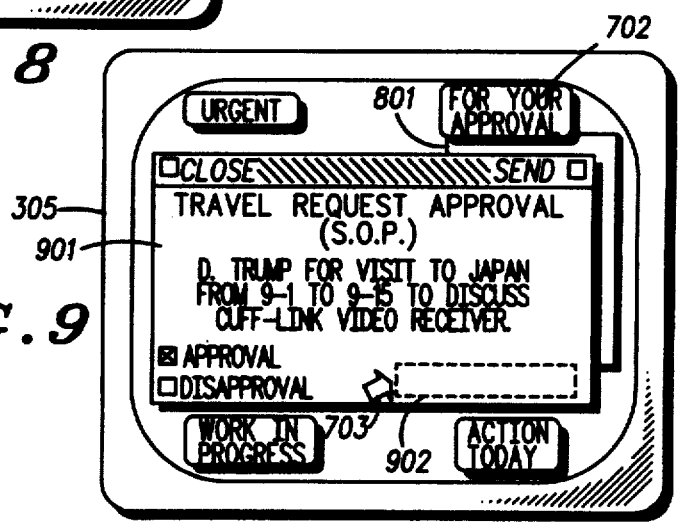

For another example, consider FIG. 8. In this example, the user has selected the "for your approval" menu (702) and has opened the full menu (801), revealing messages regarding "3Q Budget," "Travel," "New Hire," and "Felix Design." In this example, again using the pointer (703), the user selects the "travel" entry. Referring to FIG. 9 a message (901) comprising a travel request approval appears on the display (305). Upon reviewing this request, the user can approve or disapprove the permission sought, by annotating the document in the manner described above. Also, if desired, a user can annotate a document such as this through inclusion of a digitally represented signature (902). (Various mechanisms for providing a relatively secure digitally represented signature are well understood in the art. In addition, or in the alternative, another predetermined form of authentication, such as a digitized representation of a fingerprint, or an icon, could be used.) The user can then again close the annotation activity, and arrange for transmission of the annotation information to the appropriate requesting parties.

A number of important benefits should now be evident. A user, not located in his or her office, can receive documents of various kinds. These documents can be utilized in a number of typical manners, such as by reviewing and editing in accordance with the appropriate application programs. In addition, however, the user now has the capability of annotating those documents in a variety of ways and transmitting those annotations to a variety of parties, in a manner that not only equals but surpasses the tangible item counterpart in the office place as described earlier. Particularly important is the ability to automatically transmit a variety of annotation objects to any of a common destination, mutually exclusive destinations, or partially common/partially mutually exclusive destinations. This connectivity could of course support other useful activities as well.

Figure 10:
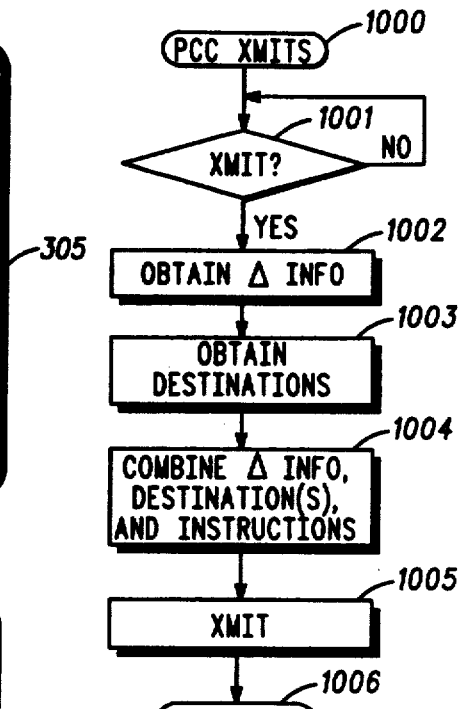
FIG. 10 comprises a flow diagram depicting transmission operation of the personal communicating computer.

Referring to FIG. 10, transmission operation (1000) of the personal communicating computer will now be described.

At such time as a transmission instruction is received (1001), the personal communicating computer obtains the delta information (i.e., the information representing the difference between the original document and the revised/annotated document) for the document (1002) which, as described above, comprises the annotation information itself (or other changes made to the document by one or more other applications) as distinct from the document. Destination information is then obtained (1003) as noted above, and the delta information, the destination addresses, and other appropriate instructions (such as the document identifiers noted above) are combined (1004) and transmitted (1005) using the wireless network. The transmission process then concludes (1006).

Upon receiving this information, the server will readily construct an annotated (or edited) version of the original document and forward it on to the intended recipient. The recipient, in turn, can now treat the annotated (or edited) document as his starting point, and repeat the above described processes to allow yet further annotations (or edits) to the base document and its previously made annotation(s).

Pursuant to this invention, using distributed processing in a wireless environment, an individual can effectively extend his or her office environment well beyond the four walls that ordinarily define that setting. Day to day review and approval tasks can proceed relatively unimpeded by significant separation of distance. The productivity and effectiveness of each individual can thereby be greatly enhanced.

The basic concepts taught here can also be readily extended. For example, instead of using annotations that include only visual information, the annotations could include instead stored audio messages. Although such an annotation would not substitute for a real-time voice communication, the same essential benefits derived above with visual information could still likely be attained. Also, of course, it would be possible to provide an annotation having both audio and visual components.

What is claimed is:

1. A method of transmitting a plurality of annotations to a document, comprising the steps of:
   in a personal communicating computer:
   A) accessing the document;
   B) when receiving a first user input comprising an annotation to the document, forming a first annotation object that comprises a representation of first annotation information and a first set of operations to carry out some actions with respect to the first annotation information, which first annotation information includes information identifying the document and which first set of operations includes instructions to provide for a combination of the annotation with the document at a location other than at the personal communicating computer;
   C) when receiving a second user input comprising another annotation to the document, forming a second annotation object that comprises a representation of second annotation information and a second set of operations to carry out some actions with respect to the second annotation information, which second annotation information includes information identifying the document and which second set of operations includes instructions to provide for a combination of the another annotation with the document at a location other than at the personal communicating computer, wherein the second annotation object comprises an object that is independent from the first annotation object;
   D) when receiving a user transmit instruction regarding at least both the first and second annotation objects, which user transmit instruction includes destination information, automatically transmitting the first and second annotation objects, but not the document, to destinations selected from any of a group of accomodatable destinations, including:
      i) a common destination;
      ii) mutually exclusive destinations;
      iii) partially common/partially mutually exclusive destinations,
   in accordance with the user destination information, such that a particular annotation object can be selectively transmitted to a selected destination, and subsequent to being transmitted by the personal communicating computer, the particular annotation object is combined with the document pursuant to the instructions to provide for a combination of the annotation with the document.

2. The method of claim 1, wherein the first user input comprises a first portion of a message, and the second user input comprises a different portion of the message.

3. The method of claim 1, wherein the step of accessing the document includes a step of displaying, on a display, at least a portion of the document.

4. The method of claim 3, wherein the step of forming the first annotation object includes the step of displaying at least a part of the first user input on the display.

5. The method of claim 4, wherein at least a part of the first user input and at least a portion of the document are displayed on the displayed on the display simultaneously.

6. The method of claim 1, wherein the step of transmitting includes transmitting via a wireless communication system.

7. A method of transmitting a plurality of annotations to a document, comprising the steps of:
   in a personal communicating computer:
   A) receiving a communication, which communication includes at least the document;
   B) storing the document;
   C) accessing the document;
   D) when receiving a first user input comprising a first annotation to the document, forming a first annotation object that comprises a representation of first annotation information and a first set of operations to carry out some actions with respect to the first annotation information, which first annotation information includes information identifying the document and which first set of operations includes instructions to provide for a combination of the first annotation with the document at a location other than at the personal communicating computer;
   E) when receiving a second user input comprising a second annotation to the document, forming a second annotation object that comprises a representation of second annotation information and a second set of operations to carry out some actions with respect to the second annotation information, which second annotation information includes information identifying the document and which second set of operations includes instructions to provide for a combination of the second annotation with the document at a location other than at the personal communicating computer, wherein the second annotation object comprises an object that is independent from the first annotation object;

F) when receiving a user transmit instruction regarding at least both the first and second annotation objects, which user transmit instruction includes destination information, automatically transmitting the first and second annotation objects, but not the document, to destinations selected from any of a group of accomodatable destinations, including:
  i) a common destination;
  ii) mutually exclusive destinations;
  iii) partially common/partially mutually exclusive destinations, in accordance with the user destination information, such that a particular annotation object can be selectively transmitted to a selected destination, and subsequent to being transmitted by the personal communicating computer, the particular annotation object is combined with the document pursuant to the instructions to provide for a combination of the annotation with the document.

8. The method of claim 7, wherein the communication also includes a script associated with the document, and the step of storing the document includes the step of executing the script.

9. The method of claim 7, wherein the first user input comprises a predetermined form of authentication.

10. The method of claim 9, wherein the predetermined form of authentication comprises a digitally represented signature.

11. The method of claim 7, wherein the step of accessing the document includes the steps of:
  C1) entering the document via an application program;
  C2) editing the document using the application program.

12. The method of claim 7, wherein step D includes the steps of:
  D1) enabling an annotation capability;
  D2) opening an object;
  D3) receiving the first user input;
  D4) storing the first user input in the object;
  D5) closing the object.

13. The method of claim 12, wherein the step of closing the object includes the step of locking the object such that it cannot be reopened for editing.

14. The method of claim 7, wherein the document as originally received comprises both a base document and at least one previously made annotation.

15. A personal communicating computer, comprising:
  A) a wireless receiver and transmitter;
  B) a memory;
  C) a display;
  D) a user input device;
  E) processing means operably couples to the wireless receiver and transmitter, the memory, the display, and the user input device, for;
    i) receiving, via the wireless receiver, a document;
    ii) storing, in the memory, the document;
    iii) displaying, on the display, at least a part of the document;
    iv) initiating an annotation mode of operation;
    v) receiving a first user input, entered through said user input device, comprising a first annotation to the document, and in response thereto forming a first annotation object that comprises a representation of first annotation information and a first set of operations to carry out some actions with respect to the first annotation information, which first annotation information includes information identifying the document and which first set of operations includes instructions to provide for a combination of the first annotation with the document at a location other than at the personal communicating computer;
    vi) receiving a second user input, entered through said user input device, comprising a second annotation to the document, and in response thereto forming a second annotation object that comprises a representation of second annotation information and a second set of operations to carry out some actions with respect to the second annotation information, which second annotation information includes information identifying the document and which second set of operations includes instructions to provide for a combination of the second annotation with the document at a location other than at the personal communicating computer, wherein the second annotated object is independent from the first annotated object;
    vii) receiving a user transmit instruction, entered through said user input device, regarding at least both the first and second annotation objects, which user transmit instruction includes destination information;
    viii) automatically transmitting, using the wireless transmitter, the first and second annotation objects, but not the document to destinations selected from any of a group of accomodate destinations, including:
      a) a common destination;
      b) mutually exclusive destinations;
      c) partially common/partially mutually exclusive destinations;

in accordance with the user destination information, such that a particular annotation object can be selectively transmitted to a select destination, and subsequent to being transmitted by the personal communicating computer, the particular annotation object is combinable with the document pursuant to the instructions to provide for a combination of the annotation with the document.

* * * * *